United States Patent
Machens et al.

(10) Patent No.: US 7,538,503 B2
(45) Date of Patent: May 26, 2009

(54) HAND-HELD POWER TOOL, IN PARTICULAR A TRIMMER OR THE LIKE, HAVING AN ELECTRIC DRIVE MOTOR

(75) Inventors: Kai-Ulrich Machens, Stuttgart (DE); Heinrich Leufen, Schwaikheim (DE); Markus Herzog, Weinstadt (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 74 days.

(21) Appl. No.: 11/736,226

(22) Filed: Apr. 17, 2007

(65) Prior Publication Data

US 2007/0247095 A1    Oct. 25, 2007

(30) Foreign Application Priority Data

Apr. 21, 2006   (DE) .................. 10 2006 018 678

(51) Int. Cl.
*H02P 7/00* (2006.01)
(52) U.S. Cl. .................. 318/268; 318/283; 318/284; 318/430; 30/276; 30/347
(58) Field of Classification Search ................ 318/268, 318/430, 283, 284; 30/276, 347
See application file for complete search history.

(56) References Cited

U.S. PATENT DOCUMENTS

| 4,884,340 | A  | * | 12/1989 | Newman ..................... 30/122 |
| 5,223,770 | A  | * | 6/1993  | Schlessmann ................ 318/17 |
| 5,357,179 | A  | * | 10/1994 | Abbagnaro et al. .......... 318/17 |
| 5,657,417 | A  | * | 8/1997  | Di Troia ..................... 388/829 |
| 6,588,109 | B2 | * | 7/2003  | Wilson ........................ 30/276 |
| 7,266,893 | B1 | * | 9/2007  | Ellson et al. ................. 30/276 |
| 7,382,104 | B2 | * | 6/2008  | Jacobson et al. ............ 318/276 |
| 2003/0208909 | A1 | * | 11/2003 | Paluszek ..................... 30/276 |
| 2004/0237315 | A1 | * | 12/2004 | Alliss ......................... 30/276 |

* cited by examiner

*Primary Examiner*—Bentsu Ro
*Assistant Examiner*—Thai Dinh
(74) *Attorney, Agent, or Firm*—Gudrun E. Huckett

(57) ABSTRACT

A hand-held power tool has an electric drive motor having a drive shaft and a tool connected to the drive shaft and rotatably driven by the drive shaft. The drive motor has a control device that has correlated therewith at least a first operating curve and a second operating curve. The control device operates the electric drive motor in idle according to the first operating curve and operates the electric drive motor under load according to the second operating curve. The first operating curve covers the low power range at low speed and the second operating curve covers a large power range at high speed.

18 Claims, 1 Drawing Sheet

HAND-HELD POWER TOOL, IN PARTICULAR A TRIMMER OR THE LIKE, HAVING AN ELECTRIC DRIVE MOTOR

BACKGROUND OF THE INVENTION

The invention relates to a hand-held power tool, in particular, a trimmer or the like, comprising a tool rotatingly driven by a drive shaft, wherein the drive shaft is driven by an electric drive motor.

Trimmers with electric drive motors have an on/off switch with which the device is switched on or off. When the electric drive motor is switched, the motor runs up to a maximum idle speed in no-load operation; this idle speed is significantly above the operating speed. In order to limit the idle speed, speed limiter circuits are employed that limit the maximum speed of the electric drive motor to a set value.

Limiting the electric speed is regularly done by limiting the power draw; however, the power output of the drive motor is then limited also in the operating state.

SUMMARY OF THE INVENTION

It is an object of the present invention to configure a hand-held power tool with an electric drive motor in such a way that a desired idle speed can be preset without this limiting the power draw of the electric motor in the load situation.

In accordance with the present invention, this is achieved in that the drive motor is provided with a control device wherein the control device has correlated therewith at least a first operating curve and a second operating curve and wherein the control device operates the electric drive motor in idle situation according to the first operating curve and in the load situation according to the second operating curve.

The drive motor has a control device that has at least a first and a second operating curves correlated therewith. In the idle situation of the electric drive motor the power draw is controlled in accordance with the first operating curve and in the load situation in accordance with the second operating curve. By means of the control action according to the invention it is possible for the first time to limit the electric drive motor of a hand-held power tool in the idle situation to a preset idle speed that is significantly below the maximum operating speed in the load situation. Despite this limitation to a significantly lowered idle speed, a maximum power draw of the electrical drive motor is possible as a result of switching to the second operating curve when a load situation occurs so that the drive motor can provide a maximum power output at the tool. Lowering of the speed in the idle situation has no effect on the power draw and the speed in the load situation.

The preset operating curves can be plotted as power versus speed; the curves are usually saved as a characteristic field. The first operating curve saved in the characteristic field corresponds to a load curve in the idle situation while the saved second operating curve corresponds to a load curve under full load. Preferably, the first operating curve covers a low power range at low speed and the second operating curve covers a large power range at high speed.

Switching between the operating curves can be realized in accordance with machine-specific or operating-specific criteria. Expediently, the switching action has a certain hysteresis so that the switching action from the first operating curve (idling) to the second operating curve (load) depends on different boundary conditions. In this way, it is to be achieved that when working with the power tool a short-term drop of load—and thus an increase of speed—does not lead immediately to a switching action to the operating curve for idling.

Expediently, switching from the first operating curve to the second operating curve is substantially done without delay and switching from the second operating curve to the first operating curve is done with delay. This can be realized in a simple way by arranging a timing element that, after the set time has elapsed, causes switching when the operating conditions for switching are still present at the moment when the set time of the timing element has elapsed. The timing element is restarted expediently every time the switching conditions exist.

The switching conditions can be made dependent on different criteria.

When the drive motor is supplied with electric power by a rechargeable battery, it is advantageous to operate the drive motor outside of the operating range in accordance with an operating curve having low power draw so that only minimal electrical power draw is permitted. The inventive switching action not only enables a low noise permanent operation; this operation mode also saves energy and this leads to a significantly extended operating time when the device is operated with a rechargeable battery.

Advantageously an acoustic pick-up is provided whose output signal is monitored in order to realize based on the output signal the switching action between the operating curves. The acoustic pick-up can be in the form of a microphone that is arranged preferably in the area of the tool head or it can be also be a pick-up for structure-borne sound that is arranged at a suitable location on the tool head, on the guide rod between the drive motor and the tool head, or on the drive motor.

Alternatively or additionally, the operating data such as speed, current, and voltage of the electric drive motor are detected by a monitoring device, and the operating point is determined by a control device, respectively. When a deviation from the first operating curve (idle curve) is detected, advantageously e.g. a comparison with a predetermined threshold value is performed, wherein upon surpassing the threshold value the control device switches to the second operating curve (full load curve), in particular without time delay. By switching to the second operating curve, a higher power output and a higher speed are enabled. When the electric drive motor runs on the first operating curve (idle situation), the power draw is reduced to a low value and the speed is lowered to a predetermined idle speed that is below operating speed.

In a simple way, an output signal that is monitored for switching between the operating curves is compared to a threshold value wherein the switching action is expediently configured such that, when the output signal drops below a first threshold value, switching to one of the operating curves takes place and, when the output signal surpasses the second threshold value, switching to the other operating curve is carried out. For example, the output signal of the acoustic pick-up is employed such that switching to the first operating curve (idle curve) is realized when the first threshold value is surpassed and switching to the second operating curve (load situation) is carried out only once the output signal drops below the second threshold value.

DESCRIPTION OF THE PREFERRED EMBODIMENTS

Figure 1:
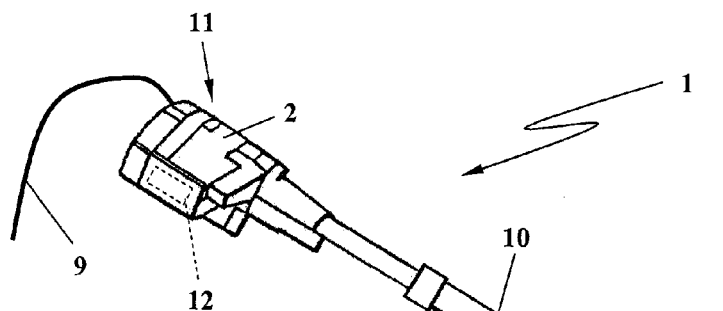
FIG. 1 is a schematic illustration of a hand-held power tool exemplified by a trimmer.

The hand-held power tool illustrated in FIG. 1 is embodied as a trimmer 1 that has a drive unit in the form of an electric drive motor 2. The electric drive motor 2 drives a tool 5 by means of a drive shaft 4, guided and supported e.g. in a guide tube 3. In the illustrated embodiment, the tool 5 is a cutting head 6 with a cutting string 7. For protecting the operator who holds and uses the trimmer 1, a safety shield 8 is arranged at the lower end of the guide tube 3. By means of electric cable 9 the electric drive motor 2 can be connected to a stationary electrical power net; alternatively, the drive motor 2 can be supplied by means of a battery, preferably a rechargeable battery 12 that is advantageously arranged in the housing of the power tool and enables cordless working.

In the illustrated embodiment, a curved guide tube 3 is provided. Straight guide tubes are of course also possible. The length of the drive shaft 4 is variable. It can be expedient to arrange the tool head 6 directly on the motor shaft of the drive motor 2 which then also has the function of a drive shaft 4.

In the illustrated embodiment, a handle 10 is provided on the guide tube 3 for holding and guiding the trimmer 1. A second handle 11 can be provided expediently in the housing area of the drive motor 2.

Figure 2:
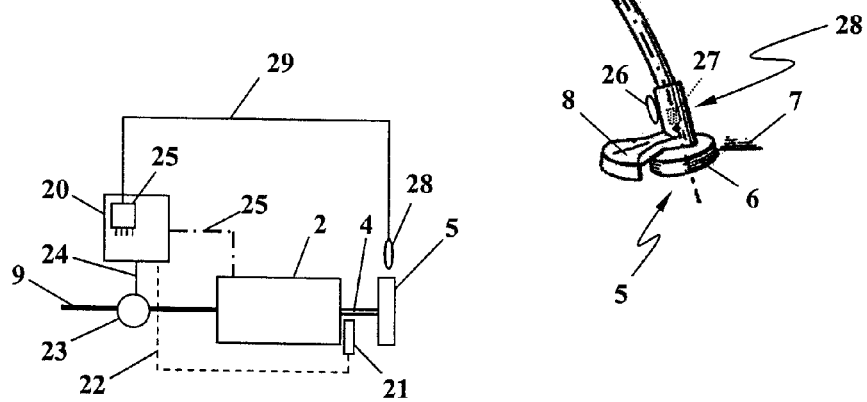
FIG. 2 is a schematic circuit diagram for operating the electric drive motor.
Figure 3:
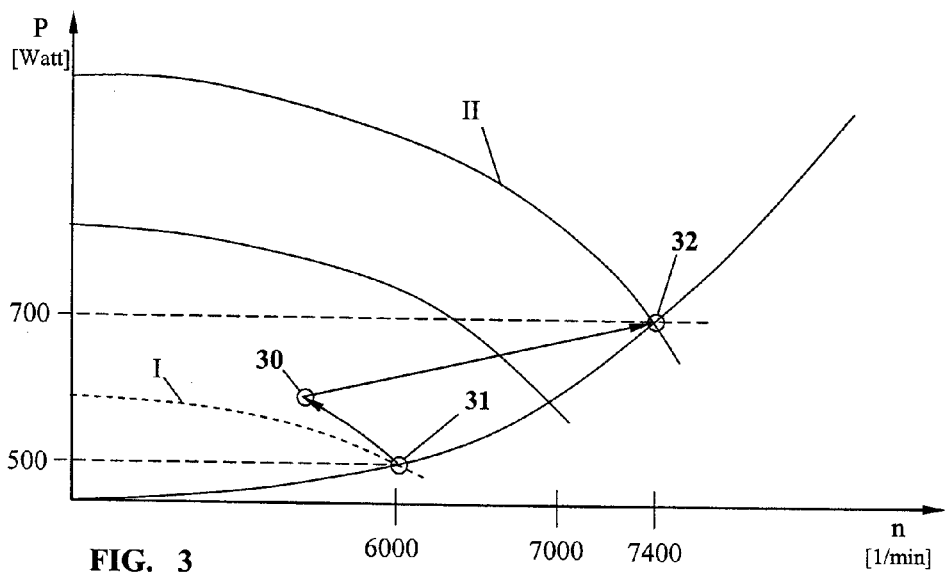
FIG. 3 is a diagram of power as a function of speed showing individual operating curves.

As shown in FIG. 2, the electric drive motor 2 drives the tool head 5 by means of drive shaft 4. The speed of the drive shaft 4 is detected by speed sensor 21 and supplied by means of signal line 22 to the control device 20. Moreover, a measuring arrangement 23 is provided for measuring current and voltage in the electric cord 9 and the detected values are supplied to the control device 20 by means of signal line 24. Based on the supplied data, the control device 20 can determine the power draw as well as the speed of the electric motor 2 and compare this to a first operating curve which is saved in a characteristic field. Such an operating curve is illustrated, for example, in FIG. 3 and provides information in regard to power P as a function of the speed n.

In a first embodiment of the invention during operation of the electric drive motor 2 the power draw P and the speed n are permanently monitored and compared with this first operating curve I. This first operating curve I corresponds advantageously to an idle curve but can also be a different operating curve. The operating curve II corresponds to a load curve. The first operating curve I covers a low power range at low speed while the second operating curve II covers a large power range at higher speed.

When during monitoring of the detected operating parameters of the electrical drive motor 2 it is determined that the resulting monitoring point 30 deviates from the operating point 31 of the operating curve I, expediently the magnitude of the deviation from the operating curve I is determined in the control unit 20 and, depending on the output signal, switching to a different operating curve II is triggered. In a simple way, the output signal can be compared with a predetermined threshold value. When the threshold value that specifies the permissible deviation is surpassed, switching to the second operating curve II is realized. By switching to the second operating curve II not only greater power P is enabled but also a higher speed n.

Switching from the operating curve I (idle curve) to the operating curve II (load) is realized expediently without substantial delay. Switching of the operating curve II (load) to operating curve I (idle), on the other hand, is expediently done with delay. The switching process itself has thus a hysteresis. For example, switching can be done when the detected deviation of the point 30 from the operating curve I exists over an extended period of time, i.e., the deviation surpasses a threshold value for time. This hysteresis can be set particularly easily by means of a timing member 25. Only after the set time of the timing member 25 has elapsed, switching to the operating curve I (idle) takes place inasmuch as at the point in time when the set time of the timing member has elapsed the switching criteria are still fulfilled. In this way, it is achieved that in case of a short-term drop of the power draw in operation of the trimmer 1, the electric motor 2 is not immediately switched to the idle curve; this could impede efficient working.

Advantageously, the on/off switch of the electrical power tool can be designed such that for complete depression of the switch like a "kick down", there is an immediate switching to the operating curve II. The configuration can be such that switching to the operating curve I (idle curve) is done automatically by means of the control device 20 and returning to operating curve II (load) is accomplished by completely depressing the on/off switch. Expediently, the on/off switch can actuate a contact (push button) in the completely depressed position so that immediately a switching signal for switching to the operating curve II is triggered.

By means of the power-adjusted speed control according to the invention it is achieved that for a drive motor operating free of load the speed n is lowered to a low speed of, for example, 6000/min by means of limiting the power draw; at the time of applying a load, the changed operating state is detected as a result of the deviation from the first operating curve I in order to switch immediately to a corresponding operating point 32 of the second operating curve II that enables a higher power uptake and thus higher speed. In load operation, the maximum electrical power P is drawn and thus higher power output by the electric drive motor is made available. When the load is no longer existing, the drawn electric power P drops while simultaneously the speed increases. This is detected by the control device 20 and, advantageously with delay, switching back to the first operating curve I as an idle curve is carried out. The speed drops to a lower idle speed.

Switching between the operating curves can be done alternatively or additionally in accordance with other criteria. According to a further embodiment, an acoustic pick-up 28 is provided which is connected by means of a signal line 29 to the control device 20. The output signal of the acoustic pick-up 28 is monitored by the control device 20 and switching between the operating curves is done as a function of the output signal. Advantageously, the output signal of the acoustic pick-up 28 is compared to a threshold value. When the threshold value is surpassed, which is the case when the motor is operated free of load according to operating curve II at high speed in idle, switching to the operating curve I (the idle curve) takes place. The noise level drops. The output signal of the acoustic pick-up drops. In order not to cause immediate switching to the operating curve II (load curve), the switching to the operating curve II can be made dependent on other criteria, for example, on the power draw of the drive motor 2. Another simple possibility resides in that a second threshold value is provided, wherein switching back to the operating curve II is carried out when surpassing or dropping below this threshold value. For example, dropping below the second threshold value and switching could be triggered when the power tool is loaded—by starting work with the power tool—in idle situation on the operating curve I so that a further drop in speed is caused and thus a reduction of the output signal is effected.

A microphone 26 is advantageously suitable as an acoustic pick-up 28; it receives the acoustic sounds of the tool or of the drive motor. Expediently, the microphone is arranged near the acoustic noise source, i.e., near the tool or the tool head.

An advantageous configuration of the acoustic pick-up 28 can be provided in the form of pick-up 27 for structure-borne sound; the pick-up 27 is arranged directly on the tool head 6, on the guide tube 3 or the drive motor 2 or the drive motor housing. The pick-up 27 for structure-borne sound is substantially immune with regard to any foreign acoustic sounds.

The specification incorporates by reference the entire disclosure of German priority document 10 2006 018 678.8 having a filing date of Apr. 21, 2006.

While specific embodiments of the invention have been shown and described in detail to illustrate the inventive principles, it will be understood that the invention may be embodied otherwise without departing from such principles.

What is claimed is:

1. A hand-held power tool comprising:
   an electric drive motor having a drive shaft;
   a tool connected to the drive shaft and rotatably driven by the drive shaft;
   the drive motor having an electronic control device wherein the electronic control device has correlated therewith at least a first operating curve and a second operating curve;
   wherein the electronic control device operates the electric drive motor in idle according to the first operating curve and operates the electric drive motor under load according to the second operating curve.

2. The hand-held power tool according to claim 1, wherein the first and second operating curves are represented as power versus speed.

3. The hand-held powertool according to claim 1, wherein the first operating curve covers a low power range at low speed and the second operating curve covers a large power range at high speed.

4. The hand-held power tool according to claim 1, wherein the first and second operating curves are saved in a characteristic field, respectively.

5. The hand-held power tool according to claim 1, wherein a switching action between the first and second operating curves has hysteresis.

6. The hand-held power tool according to claim 5, further comprising a timing member, wherein switching is realized after a time set by the timing member has elapsed.

7. The hand-held power tool according to claim 1, wherein in operation of the electric drive motor the electronic control device monitors a power draw and a speed of the electric drive motor and wherein switching between the first and second operating curves is done as a function of output signals of the control device.

8. The hand-held power tool according to claim 7, wherein the output signals are evaluated by comparison with data of one of the first and second operating curves.

9. The hand-held power tool according to claim 7, wherein the output signals are evaluated by comparison with data of the first operating curve.

10. A hand-held power tool comprising:
    an electric drive motor having a drive shaft;
    a tool connected to the drive shaft and rotatably driven by the drive shaft;
    the drive motor having a control device wherein the control device has correlated therewith at least a first operating curve and a second operating curve;
    wherein the control device operates the electric drive motor in idle according to the first operating curve and operates the electric drive motor under load according to the second operating curve;
    wherein a switching action between the first and second operating curves has hysteresis;
    wherein switching from the first operating curve to the second operating curve is realized substantially without delay and switching from the second operating curve to the first operating curve is done with delay.

11. A hand-held power tool comprising:
    an electric drive motor having a drive shaft;
    a tool connected to the drive shaft and rotatably driven by the drive shaft;
    the drive motor having a control device wherein the control device has correlated therewith at least a first operating curve and a second operating curve;
    wherein the control device operates the electric drive motor in idle according to the first operating curve and operates the electric drive motor under load according to the second operating curve;
    a rechargeable battery that supplies the electric drive motor with power, wherein the electric drive motor outside of the working range is switched to one of the first and second operating curves providing low power draw.

12. A hand-held power tool comprising:
    an electric drive motor having a drive shaft;
    a tool connected to the drive shaft and rotatably driven by the drive shaft;
    the drive motor having a control device wherein the control device has correlated therewith at least a first operating curve and a second operating curve;
    wherein the control device operates the electric drive motor in idle according to the first operating curve and operates the electric drive motor under load according to the second operating curve;
    an acoustic pick-up whose output signal is monitored, wherein switching between the first and second operating curves is done as a function of the output signal.

13. The hand-head power tool according to claim 12, wherein the acoustic pick-up is a pick-up for structure-borne sound.

14. The hand-held power tool according to claim 12, wherein the acoustic pick-up is a microphone.

15. The hand-held power tool according to claim 12, wherein switching is done based on a comparison of the output signal with a threshold value.

16. The hand-held power tool according to claim 15, wherein switching is done based on a comparison of the output signal with a first and a second threshold values, wherein upon dropping below the first threshold value switching to the first operating curve is done and wherein upon surpassing the second threshold value switching to the second operating curve is done.

17. A hand-held power tool comprising:
    an electric drive motor having a drive shaft;
    a tool connected to the drive shaft and rotatably driven by the drive shaft;
    the drive motor having a control device wherein the control device has correlated therewith at least a first operating curve and a second operating curve;
    wherein the control device operates the electric drive motor in idle according to the first operating curve and operates the electric drive motor under load according to the second operating curve;
    wherein in operation of the electric drive motor the control device monitors a power draw and a speed of the electric drive motor and wherein switching between the first and second operating curves is done as a function of output signals of the control device;

wherein switching is done based on a comparison of the output signals with a threshold value.

18. A hand-held power tool comprising:
an electric drive motor having a drive shaft;
a tool connected to the drive shaft and rotatably driven by the drive shaft;
the drive motor having a control device wherein the control device has correlated therewith at least a first operating curve and a second operating curve;
wherein the control device operates the electric drive motor in idle according to the first operating curve and operates the electric drive motor under load according to the second operating curve;
wherein in operation of the electric drive motor the control device monitors a power draw and a speed of the electric drive motor and wherein switching between the first and second operating curves is done as a function of output signals of the control device;
wherein switching is done based on a comparison of the output signals with a first and a second threshold values, wherein upon dropping below the first threshold value switching to the first operating curve is done and wherein upon surpassing the second threshold value switching to the second operating curve is done.

* * * * *